US006515080B1

(12) United States Patent
Wiegner et al.

(10) Patent No.: US 6,515,080 B1
(45) Date of Patent: Feb. 4, 2003

(54) PROCESS FOR PREPARATION OF POLYETHYLENE TEREPHTHALATE MODIFIED BY O-PHTHALIC ACID UNITS

(75) Inventors: Jens-Peter Wiegner, Halle (DE); Volkmar Voerckel, Merseburg (DE); Sarat Munjal, Lake Jackson, TX (US)

(73) Assignee: The Dow Chemical Company, Midland, MI (US)

( * ) Notice: Subject to any disclaimer, the term of this patent is extended or adjusted under 35 U.S.C. 154(b) by 409 days.

(21) Appl. No.: 10/018,535

(22) PCT Filed: Jun. 10, 2000

(86) PCT No.: PCT/DE00/01926

§ 371 (c)(1),
(2), (4) Date: Feb. 5, 2002

(87) PCT Pub. No.: WO01/02461

PCT Pub. Date: Jan. 11, 2001

(30) Foreign Application Priority Data

Jul. 2, 1999 (DE) .......................................... 199 30 705

(51) Int. Cl.[7] .................................................. C08F 20/00
(52) U.S. Cl. ...................... 525/444; 528/272; 528/302; 528/308; 528/308.3; 528/308.6
(58) Field of Search ................................ 528/272, 302, 528/308, 308.6, 308.3; 525/444

(56) References Cited

U.S. PATENT DOCUMENTS

| 4,546,169 A | * | 10/1985 | Chandler et al. | ............. | 521/172 |
| 4,618,386 A | | 10/1986 | Yatsu | ......................... | 156/242 |
| 4,835,247 A | | 5/1989 | Wilson et al. | ............... | 528/272 |
| 4,921,929 A | | 5/1990 | Wison et al. | ................ | 528/272 |
| 4,940,616 A | | 7/1990 | Nobuya | ...................... | 528/35.7 |
| 5,310,787 A | | 5/1994 | Kutsuwa et al. | ............ | 524/513 |

FOREIGN PATENT DOCUMENTS

| DE | 2126217 | 12/1971 |
| DE | 2166285 | 9/1973 |
| DE | 2706128 | 8/1978 |
| EP | 0051553 A1 | 5/1982 |
| EP | 0465040 B1 | 1/1997 |
| GB | 1060401 | 3/1967 |
| JP | 4913249 | 2/1974 |
| JP | 5062245 | 5/1975 |
| JP | 52124098 | 10/1977 |
| JP | 8188919 | 7/1996 |
| JP | 6184415 | 11/1999 |
| RO | 104034 | 5/1992 |

OTHER PUBLICATIONS

SU 994490; "Prepn. Of lacquer resin of polythylene terephthalate waste—involves using alkyd resin for ester exchange reaction to reduce vegetable oil expenditure", Inventors, Dynin, VS; Orekhov, VN; Rudenko, BM, Sep. 1993.

* cited by examiner

Primary Examiner—Samuel A. Acquah

(57) ABSTRACT

The invention relates to a process to produce polyethylene terephthalate modified with o-phtalic acid units while avoiding any high phthalic acid losses during esterification or polycondensation and while maintaining the favorable use properties effected by the phthalic acid.

According to the present invention, a precondensate made of phthalic anhydride and ethylene glycol in a non-catalytic reaction is added in the esterification and/or polycondensation stages, whereby the ethylene glycol is used at a molar excess of 2 to 3.5 relative to the phthalic anhydride.

3 Claims, No Drawings

PROCESS FOR PREPARATION OF POLYETHYLENE TEREPHTHALATE MODIFIED BY O-PHTHALIC ACID UNITS

The present invention relates to a process to produce polyethylene terephthalate (PET) modified with o-phthalic acid units.

Polyethylene terephthalate, specifically when used as a raw material for making packaging materials, is modified with various comonomers in order to obtain favorable use properties. Here, preferably substances are used that break the chain orientation. This is meant to achieve a lower melting point, which is critical for the formation of by-products (such as acetic aldehyde) during production and processing, and a lower thermal crystallization rate. The lower crystallization rate allows to produce semi-finished products for different uses.

Mainly isophthalic acid (EP 465 040, U.S. Pat. Nos. 4,618,386, 4,835,247, 4,921,929, 4,940,616, 5,310,787) and cyclohexane dimethanol (U.S. Pat. Nos. 5,283,295, 5,310,787) have been described as comonomers. Both substances are special-purpose chemicals.

The use of phthalic anhydride as a catalyst in PET production (DE 2 126 217, DE 2 166 285, JP 49 013 249, JP 50 062 245, JP 52 124 098) and for modifying end groups (EP 51 553 and SU 994 490) is known. JP 08 188 919 and JP 06 184 415 describe the use of phthalic anhydride to produce polyethylene terephthalate fibers. The use of phthalic anhydride in esterification is problematic both because of the distinctive tendency of this substance to sublimate as well as because of the tendency to form cyclic oligomers with a comparatively low boiling point. This causes high losses of phthalic acid in the esterification and in the polycondensation stages.

The production of polyethylene terephthalate with a content of 25 to 55 percent by weight of phthalic acid units is patented in the Romanian patent RO 104 034. The polycondensation of bis(hydroxyethyl)terephthalate with a bis(hydroxyethyl)phthalate has been described. The phthalate is synthesized through the conversion of ethylene glycol with phthalic anhydride with a molar excess of the ethylene glycol in relation to the terephthalic acid of 3–6:1, and in the presence of zinc acetate acting as a catalyst. Phthalate produced in this manner cannot be used in the synthesis of packaging materials as the extremely high diethylene glycol content (>20%) of this ester strongly reduces the glass transition temperature of the modified polyethylene terephthalate. Also, this catalyst affects the polyester at high temperatures because zinc acetate catalyses the thermal decomposition of polyethylene terephthalate. That is why the copolyesters made in this way are exclusively used as adhesives. The synthesis of stable block copolyesters under the addition of phosphoric compounds is described in GB 1 060 401.

DE 2 706 128 patents the use of phthalic acid esters as plasticizers for polyethylene terephthalate. The esterification of the end groups of these phthalic acid esters with monofunctional alcohols (such as Nonanol) prevents the inclusion in the PET.

It is the purpose of this invention to present a process to produce polyethylene terephthalate modified with o-phthalic acid units while at the same time avoiding high phthalic acid losses during esterification and polycondensation, and while at the same time maintaining the favorable use properties provided by the phthalic acid.

To this end, a precondensate made from phthalic anhydride and ethylene glycol by way of a non-catalytic reaction is added in the esterification and/or polycondensation stages, whereby ethylene glycol is used at a molar excess relative to the phthalic anhydride of 2 to 3.5, preferably of 2.5 to 3.

As a result and according to the present invention, between 0.1 and 10 percent by weight, preferably 0.5 to 6 percent by weight, of phthalic acid can be included in the polyethylene terephthalate.

Surprisingly, it was found that the losses, which are caused by the sublimation of the phthalic anhydride and the formation of relatively highly volatile cyclic esters from phthalic acid and ethylene glycol, can be considerably minimized through the use of catalyst-free precondensates of phthalic anhydride and ethylene glycol without causing any deviation of the use properties from those of the polyethylene terephthalate modified with phthalic anhydride.

It was further found that the precondensate of phthalic anhydride and ethylene glycol should be made with an ethylene glycol excess.

It is a major advantage of the present invention that phthalic anhydride, which is available at commercial scale, is used to modify the PET.

The invention is explained with the following embodiments.

Embodiment No. 1: Phthalic Anhydride/EG Oligomer Synthesis, Scenario A (Reference)

592.56 g (4 moles) of phthalic anhydride and 496.56 g (8 moles) of ethylene glycol were placed in a two-liter three-necked flask with a stirrer, a thermometer and a distillation connecting tube, and heated with stirring. The reaction water started to distillate at a sump temperature of >170° C. The conversion was discontinued at a sump temperature of 230° C., and 148.14 g (1 mole) of phthalic anhydride and 124.14 g (2 moles) of ethylene glycol were added. Heating was continued up to a sump temperature of 230° C. with constant distillation of the reaction water. After that, 148.14 g (1 mole) of phthalic anhydride and 217.24 g (3.5 moles) of ethylene glycol were added. This reaction mixture was then heated to a sump temperature of 260° C. with constant distillation of the reaction water and of the excess ethylene glycol. After cooling, the viscous reaction product was subjected to a GC-MS analysis. Table 1 gives an overview of the identified oligomers.

TABLE 1

GC-MS analysis of the phthalic anhydride/ethylene glycol condensate

| Peak no. | Structure | Molecular weight [g/mole] | Area percent |
| --- | --- | --- | --- |
| 1 | diethylene glycol | 106 | 1.6 |
| 2 | triethylene glycol | 150 | 0.2 |
| 3 | phthalic anhydride | 148 | 2.8 |
| 4 | cycl. esters | 192 | 2.9 |
| 5 | phthalic acid | 166 | 11.7 |
| 6 | monoesters | 210 | 1.6 |
| 7 | diesters | 254 | 37.2 |
| 8 | cycl. esters | 280 | 7.9 |
| 9 | linear esters | 402 | 19.6 |
| 10 | cycl. esters | 428 | 5.0 |
| 11–14 | linear oligomers | | 9 |

Due to its very high content of relatively highly volatile cyclic esters, this precondensate of phthalic anhydride and ethylene glycol is not qualified for inclusion under polycondensation conditions.

Embodiment No. 2: Phthalic Anhydride/EG Oligomer Synthesis, Scenario B (Reference)

The synthesis of these oligoesters was performed with the 4.5-fold molar excess of ethylene gycol relative to the phthalic anhydride quoted in the Romanian patent RO 104 034, but without the catalyst.

592.56 g (4 moles) of phthalic anhydride and 1,117.26 g (18 moles) of ethylene glycol were placed in an apparatus similar to that described for embodiment no. 1, and heated to a sump temperature of 260° C. with constant stirring and distillation of the reaction water and of part of the excess ethylene glycol.

The methanolysis of the reaction product resulted in a diethylene glycol content of 23.9 percent by weight, determined by means of gas chromatographical analysis. Due to its very high diethylene glycol concentration and composition (very high content of relatively highly volatile oligomers), this product does not qualify for modifying polyethylene terephthalate.

Embodiment No. 3: Phthalic Anhydride/EG Oligomer Synthesis, Scenario C (Reference)

101.6 g (0.4 mole) of bis(2-hydroxyethyl)terephthalate and 59.2 g (0.4 mole) of phthalic anhydride were placed in a 250 ml three-necked flask with a thermometer, a reflux condenser and a stirrer, and heated to 260° C. with stirring. The NMR analysis has confirmed the structure of the bis(2-hydroxyethyl)terephthalate esterified with phthalic acid on one side.

Embodiment No. 4: Phthalic Anhydride/EG Oligomer Synthesis, Scenario D (Embodiment According to the Invention)

592.56 g (4 moles) of phthalic anhydride and 496.45 g (8 moles) of ethylene glycol were placed in an apparatus similar to that of embodiment no. 1, and heated to 230° C. with constant distillation of the reaction water. The conversion was discontinued, and 148.12 g (1 mole) of phthalic anhydride and 248.3 g (4 moles) of ethylene glycol were added, and heated to 230° C. again.

This procedure was repeated four times in total. After the last addition, the conversion was discontinued at a sump temperature of 260° C.

Table 2 shows the results of the GC-MS analysis of the reaction product.

TABLE 2

GC-MS analysis of the phthalic anhydride/ethylene glycol condensate

| Peak no. | Structure | Molecular weight [g/mole] | Area percent |
| --- | --- | --- | --- |
| 1 | ethylene glycol | 62 | >0.05 |
| 2 | phthalic anhydride | 148 | <0.05 |
| 3 | phthalic acid | 166 | 1.0 |
| 4 | monoesters | 210 | 0.7 |
| 5 | diesters | 254 | 66.3 |
| 6 | linear esters | 298 | 13.0 |
| 7 | cycl. esters | 324 | 0.8 |
| 8 | linear esters | 342 | 12.7 |
| 9-10 | linear oligomers | | 5.3 |

The GC-MS analysis basically confirmed the qualification of this precondensate of phthalic anhydride and ethylene glycol for the synthesis of a modified polyethylene terephthalate.

Embodiment No. 5: Polycondensation Scenario No. 1
Synthesis of a Polyethylene Terephthalate Modified with Phthalic Acid Units Through Addition of Phthalic Acid Comonomers Prior to Esterification 664.64 g of terephthalic acid, 335.18 g of ethylene glycol, 0.623 g of antimony triacetate as well as the corresponding amount of phthalic acid comonomers were placed in a 2.3-liter V2A steel reactor. The reaction mixture was heated to 250° C. with constant stirring. When the internal pressure reached 3 bars, gradual depressurization was initiated over a period of 100 minutes. The esterification stage was followed by a polycondensation stage in vacuo (between 0.5 and 15 mbar) at 275° C.

The products were analyzed for their phthalic acid content by way of NMR spectroscopy.

Embodiment No. 6: Polycondensation Scenario No. 2
Synthesis of a Polyethylene Terephthalate Modified with Phthalic Acid Units Through Addition of Phthalic Acid Comonomer Prior to Polycondensation In an experimental set-up and after an experimental procedure similar to those of embodiment no. 5, the phthalic anhydride was added after the esterification stage only. After this addition, stirring took place under pressure for 10 minutes. This was followed by polycondensation similar to embodiment no. 1.

The products were analyzed for their phthalic content by way of NMR spectroscopy (see Table 3).

Embodiment No. 7: Polycondensation Scenario No. 3
Synthesis of a Polyethylene Terephthalate Modified with Phthalic Acid Units Through Addition of Phthalic Anhydride Prior to Polycondensation The experimental set-up and procedure were similar to those of embodiment no. 5. After the addition of the phthalic acid comonomer, stirring occurred under pressure for 60 minutes.

The products were analyzed for their phthalic acid content by way of NMR spectroscopy.

The Table below gives an overview of the phthalic acid content, which was determined by way of NMR spectroscopy, as a function of the phthalic acid comonomer and the synthesis scenario.

TABLE 3

Phthalic acid content as a function of the phthalic acid comonomer and synthesis scenario.

| Emb. no. | Phthalic acid comonomer | Polycondensation scenario | Phthalic acid (theoretical) | Phthalic acid (found) | % found |
| --- | --- | --- | --- | --- | --- |
| 1 | Phthalic anhydride | 1 | 5 mole per cent | 2.58 mole per cent | 51.6 |
| 2 | Phthalic anhydride | 2 | 5 mole per cent | 2.02 mole per cent | 40.4 |
| 3 | Phthalic anhydride | 3 | 5 mole per cent | 2.13 mole per cent | 42.6 |
| 4 | Ester acc. to scenario A | 1 | 5 mole per cent | 3.48 mole per cent | 69.6 |
| 5 | Ester acc. to scenario B | 3 | 6 mole per cent | 3.81 mole per cent | 63.5 |
| 6 | Ester acc. to scenario C | 3 | 6 mole per cent | 3.25 mole per cent | 54.2 |
| 7 | Ester acc. to scenario D | 1 | 5 mole per cent | 4.6 mole per cent | 92 |
| 8 | Ester acc. to scenario D | 2 | 5 mole per cent | 4.37 mole per cent | 87.5 |
| 9 | Ester acc. to scenario D | 3 | 5 mole per cent | 4.6 mole per cent | 92 |
| 10 | Ester acc. to scenario D | 3 | 10 mole per cent | 8.77 mole per cent | 87.7 |

These results illustrate the advantage of the use of phthalic acid/ethylene glycol oligomers as compared to phthalic anhydride.

At the same time, the critical significance of the composition of the oligomer mixtures is obvious.

The addition of phthalic acid/ethylene glycol esters in the esterification or polycondensation stage provides a very efficient means of producing a polyethylene terephthalate modified with phthalic acid units.

With regard to the glass transition temperature (76° C. to 81° C.), the melting temperature (230° C. to 250° C.), and a modified crystallization behavior, the polyester synthesized in this way meets the requirements of producing semi-finished products for specific uses.

What is claimed is:

1. A process to produce polyethylene terephthalate modified with o-phthalic acid units, characterized by the fact that a precondensate made from phthalic anhydride and ethylene glycol in a non-catalytic reaction is added in the esterification and/or polycondensation stages, whereby the ethylene glycol is used at a molar excess of 2.5 to 3.0 relative to the phthalic anhydride.

2. A process according to claim 1, characterized by the fact that between 0.1 and 10 percent by weight of phthalic acid are included in the polyethylene terephthalate.

3. A process according to claims 1 through 2 above, characterized by the fact that between 0.5 and 6 percent by weight of phthalic acid are included in the polyethylene terephthalate.

* * * * *